US007523500B1

(12) United States Patent
Szor et al.

(10) Patent No.: US 7,523,500 B1
(45) Date of Patent: Apr. 21, 2009

(54) FILTERED ANTIVIRUS SCANNING

(75) Inventors: Peter Szor, Northridge, CA (US); Gregory D. Vogel, Chatsworth, CA (US)

(73) Assignee: Symantec Corporation, Cupertino, CA (US)

( * ) Notice: Subject to any disclaimer, the term of this patent is extended or adjusted under 35 U.S.C. 154(b) by 715 days.

(21) Appl. No.: 10/864,109

(22) Filed: Jun. 8, 2004

(51) Int. Cl.
    *G06F 11/00* (2006.01)

(52) U.S. Cl. .................. 726/24; 726/22; 726/23; 726/25

(58) Field of Classification Search ............ 726/24
     See application file for complete search history.

(56) References Cited

U.S. PATENT DOCUMENTS

| | | | | |
|---|---|---|---|---|
| 5,649,095 | A | * | 7/1997 | Cozza ................ 714/39 |
| 6,735,700 | B1 | * | 5/2004 | Flint et al. ............ 726/24 |
| 6,976,271 | B1 | * | 12/2005 | Le Pennec et al. ...... 726/24 |

OTHER PUBLICATIONS

Kumar, S., et al, 'A Generic Virus Scanner in C++', Dept. of CS, Purdue University, 1992, entire document, http://ieeexplore.ieee.org/stamp/stamp.jsp?arnumber=00228218.*
Mitchell et al., Best Practice for Multi-tier Virus Protection, Jun. 2002 [Retrieved Dec. 1, 2004], Retrieved from the internet<URL: http://www.sophos.com/sophos/docs/eng/papers/multi_wen.pdf, Oxford, United Kingdom.
Rodriguez, WinFS Data Model, Feb. 13, 2004 [Retrieved Dec. 1, 2004], Retrieved from the Internet<URL: http://www.c-sharpcorner.com/Longhorn/WinFS/WinFSDataModel.asp.
Fact Sheet on Sophos Anti-Virus (Desktop/Server Protection) [Retrieved Dec. 1, 2004], Retrieved from the Internet<URL: http://www.sophos.com/sophos/docs/eng/factshts/Sophos_SAV_fsuk.pdf.
Microsoft Anti-Virus CHKLIST.MS Files Explained [Retrieved Dec. 1, 2004], Retrieved from the Internet<URL: http://support.microsoft.com/default.aspx?scid=kb;en-us;99148.
Odd MSAV Behavior When CHKLIST.MS Files are Read-Only [Retrieved Dec. 1, 2004], Retrieved from the Internet<URL: http://support.microsoft.com/default.aspx?scid=kb;en-us;101560.
Sophos Anti-Virus for Windows Product Tour [Retrieved Dec. 1, 2004], Retrieved from the Internet<URL: http://www.sophos.com/sophos/docs/eng/marketing_material/Sophos_SAV_Win_ProductTour_uk.pdf.

* cited by examiner

*Primary Examiner*—Kambiz Zand
*Assistant Examiner*—Ronald Baum
(74) *Attorney, Agent, or Firm*—Fenwick & West LLP (57) ABSTRACT

An antivirus client module (114) includes a virus definitions module (312) holding information describing characteristics of files that can potentially be infected by viruses and information enabling a determination of whether a file is actually infected by a virus. The client module (114) also includes a filtering module (314) having a file information cache (410) describing characteristics of files. A file scanning module (316) can scan files to determine whether the files are infected by viruses. The antivirus client module (114) queries the file information cache (410) using the information describing characteristics of files to identify the set of files that are susceptible to a given virus. The file scanning module (316) scans the files in the set.

10 Claims, 5 Drawing Sheets

FILTERED ANTIVIRUS SCANNING

BACKGROUND OF THE INVENTION

1. Field of the Invention

This invention pertains in general to detecting computer viruses and in particular to techniques for enabling faster antivirus scanning.

2. Background Art

Modern computer systems are under constant threat of attack from computer viruses and other malicious code. Viruses often spread through the traditional route: a computer user inserts a disk or other medium infected with a virus into a computer system. The virus infects the computer system when data on the disk are accessed.

Viruses also spread through new routes. A greater number of computer systems are connected to the Internet and other communications networks than ever before. These networks allow a computer to access a wide range of programs and data, but also provide a multitude of new avenues by which a computer virus can infect the computer. Some viruses exploit the broad reach of the networks and can spread rapidly to thousands or millions of computer systems.

In order to prevent the spread of viruses, it is common practice for end-users to install antivirus software on their computer systems. The software monitors the files stored on the computer system and detects files that are infected with a virus. This task has become more difficult in recent times because the number of files on a typical computer system has increased dramatically. A few years ago, an average computer system might have stored 10,000 files. Now, such a computer system might store more than 100,000 files. Thus, there is a much larger pool of potentially-infected files that the antivirus software must scan.

Moreover, scanning an individual file for the presence of a virus takes longer now than in the past. When viruses first became a problem, antivirus software could use relatively quick techniques such as string scanning to determine whether a file was infected. Now, viruses use very sophisticated techniques, such as polymorphism, to hide their presence. As a result, antivirus software must use more advanced and time consuming technologies, such as software emulation, to detect the presence of viruses. The increased pool of potentially-infected files and the need to perform time consuming virus detection techniques have resulted in a major increase in the amount of time required to scan a computer system for a virus.

This time increase becomes especially apparent when a network-based virus outbreak occurs. In the event of an outbreak, the antivirus vendor usually distributes to the end-user computer systems a virus definition that describes how to detect and, in some cases, remove the virus. The end-user must perform a full system scan of the computer system to determine if any files are infected. This scan can tie up the computer system for hours or, in extreme cases, days. Since virus outbreaks occur frequently, the lost productivity associated with antivirus scanning is significant. Therefore, there is a need in the art for a technique that can more quickly determine whether a computer system is infected with a virus.

DISCLOSURE OF INVENTION

The above need is met by an antivirus client module (114) that identifies the set of files that are susceptible to a given virus, and scans only those files to determine whether they are infected by the virus. In one embodiment, the antivirus client module (114) includes a virus definitions module (312) holding information describing characteristics of files that can potentially be infected by viruses and information enabling a determination of whether a file is actually infected by a virus. The antivirus client module (114) also includes a filtering module (314) having a file information cache (410) describing characteristics of files. The antivirus client module (114) queries the file information cache (410) using the information describing characteristics of files to identify the set of files that are susceptible to a given virus. The antivirus client module (114) causes a file scanning module (316) to scan only the set of susceptible files for the virus. Thus, the scanning is performed efficiently and quickly.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
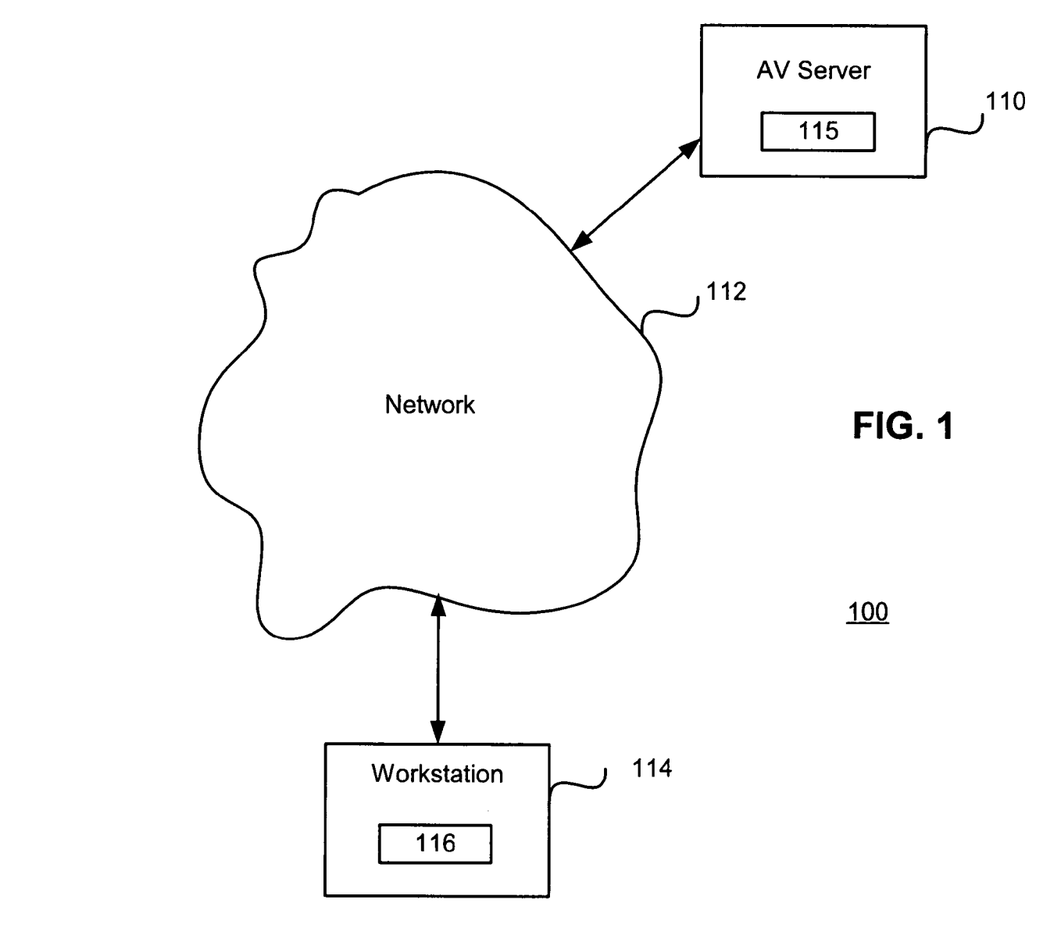
FIG. 1 is a high-level block diagram of a computing environment 100 according to one embodiment of the present invention.

FIG. 1 is a high-level block diagram of a computing environment 100 according to one embodiment of the present invention. FIG. 1 illustrates an antivirus server 110 connected to a network 112. The network 112 is also connected to a workstation 114.

The network 112 provides communications between and among the other entities illustrated in the computing environment 100 of FIG. 1. In one embodiment, the network 112 is the Internet and uses wired and/or wireless links. All or part of the network 112 may include a cellular telephone network or other data network having a peering point with the Internet. The network 112 can also utilize dedicated or private communications links that are not necessarily part of the Internet. The entities illustrated in FIG. 1 use conventional communications technologies such as the transmission control protocol/Internet protocol (TCP/IP) to communicate over the network. The entities of FIG. 1 also use conventional communications protocols such as the hypertext transport protocol (HTTP), the simple mail transfer protocol (SMTP), the file transfer protocol (FTP), etc. The entities can also engage in secure communications using technologies including the secure sockets layer (SSL), Secure HTTP and/or virtual private networks (VPNs). The communicated messages utilize conventional data encodings such as hypertext markup language (HTML), extensible markup language (XML), etc.

In one embodiment, all or part of the network 112 includes non-electronic links. For example, the antivirus server 110 may communicate with the workstation 114 via U.S. mail, etc.

The antivirus server 110 is provided by an antivirus software vender or other entity. The antivirus server 110 can include one or more standard computer systems configured to communicate with workstations 114 via the network 112. For example, the antivirus server 110 can include a web server, FTP server, or other technology that enables the antivirus server 110 to interact with, and provide content to, the workstations 114 via the network 112. In one embodiment, the antivirus server 110 provides virus definitions 115 to the workstation 114 via the network 112.

The workstation 114 is an electronic device susceptible to infection by a computer virus. In one embodiment, the workstation 114 is a conventional computer system executing, for example, a Microsoft Windows-compatible operating system (OS), Apple OS X, and/or a Linux-compatible OS. In another embodiment, the workstation 114 is another device having computer functionality, such as a personal digital assistant (PDA), cellular telephone, video game system, etc. The workstation 114 typically stores numerous computer files that are susceptible to infection by a virus. Although only one workstation 114 is shown in FIG. 1, embodiments of the present invention can have thousands or millions of such workstations.

In one embodiment, the workstation 114 executes an antivirus client module 116 for detecting the presence of a computer virus on the workstation. The antivirus client module 116 can be provided, for example, by the entity that operates the antivirus server 110. The antivirus module 116 can communicate with the antivirus server 110 via the network 112 in order to download the virus definitions 115 and/or other information utilized to detect viruses on the workstation 114. In addition, the downloaded information can be utilized to repair files or other components of the workstation 114 that are infected by the virus. In one embodiment, the antivirus module 116 provides information to the antivirus server 110, such as information describing viruses found on the workstation 114.

In one embodiment, the antivirus client module 116 is adapted to create a file information cache 410 that describes and characterizes the files on the workstation 114. The antivirus client module 116 uses the file information cache 410 and/or information provided in the virus definitions 115 to determine the set of files on the workstation 114 that are susceptible to infection by viruses and/or a particular virus. Oftentimes, the set of files that are susceptible are a subset of the total files stored by the workstation 114. The antivirus client module 116 need only examine the files within the set when searching for a virus, thereby reducing the time required to determine if the virus is present on the workstation 114.

Figure 2:
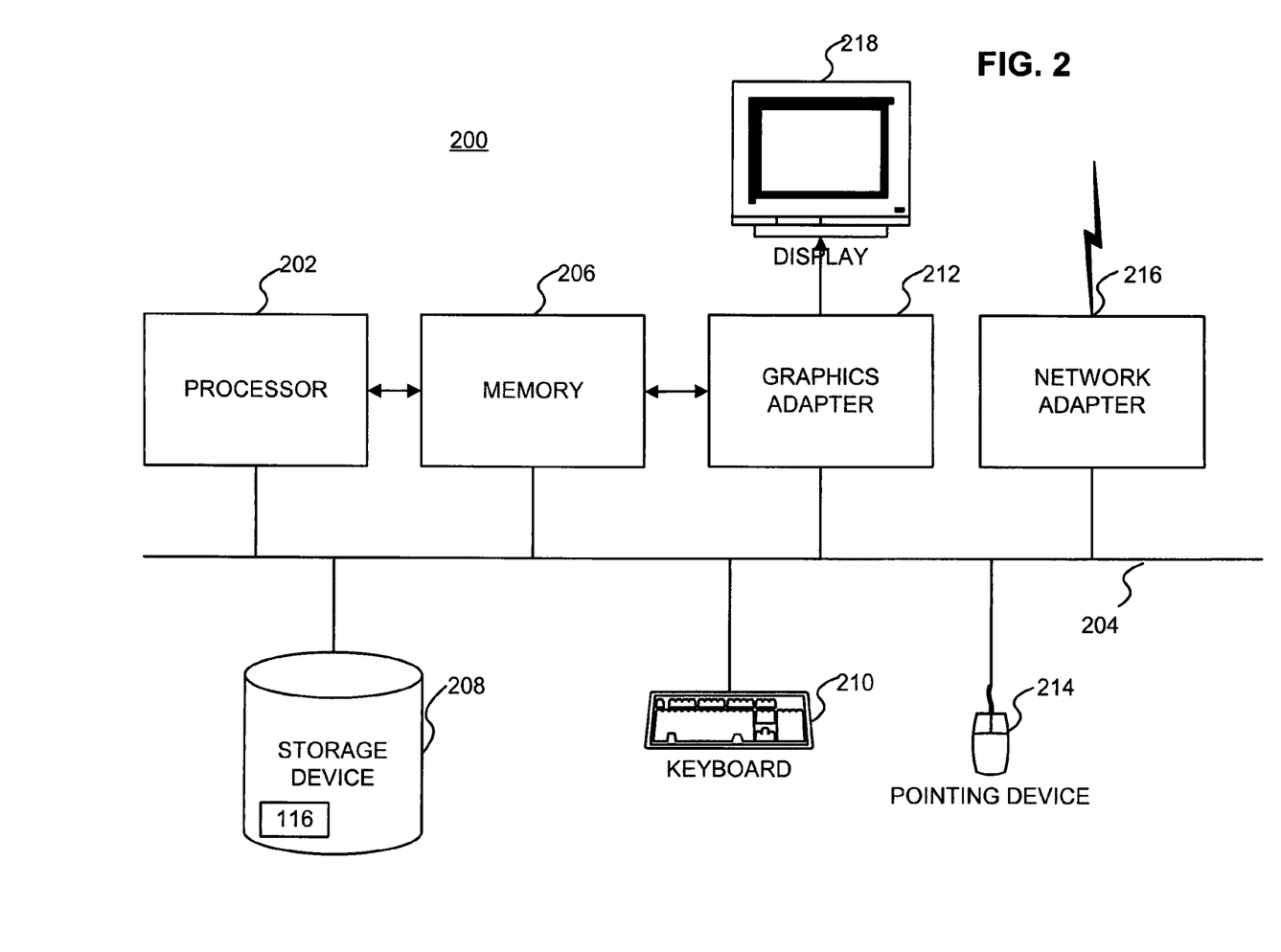
FIG. 2 is a high-level block diagram illustrating a functional view of a typical computer system 200 acting as a workstation 114 according to one embodiment of the present invention.

FIG. 2 is a high-level block diagram illustrating a functional view of a typical computer system 200 acting as a workstation 114 according to one embodiment of the present invention. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The storage device 208 stores multiple computer files. The pointing device 214 may be a mouse, track ball, or other type of pointing device, and is used in combination with the keyboard 210 to input data into the computer system 200. The graphics adapter 212 displays images and other information on the display 218. The network adapter 216 couples the workstation 114 with the network 112.

As is known in the art, the computer system 200 is adapted to execute computer program modules for providing functionality described herein. In this description, the term "module" refers to computer program logic for providing the specified functionality. A module can be implemented in hardware, firmware, and/or software. It will be understood that the modules described herein represent one embodiment of the present invention. Certain embodiments may include other modules. In addition, the embodiments may lack modules described herein and/or distribute the described functionality among the modules in a different manner. In one embodiment, the modules are stored on the storage device 208, loaded into the memory 206, and executed by the processor 202. In the illustrated embodiment, the one or more files forming the antivirus client module 116 are stored on the storage device 208.

Figure 3:
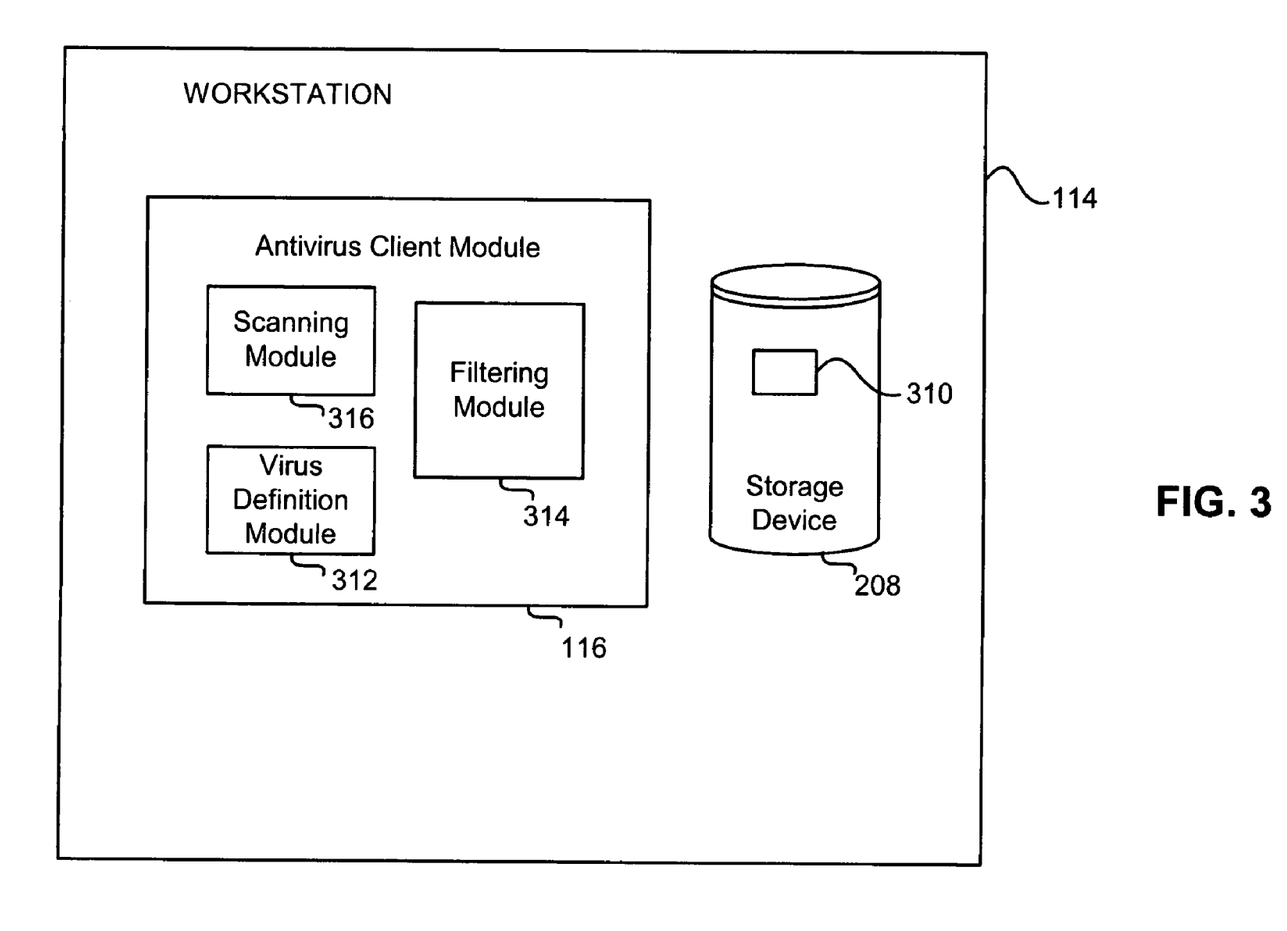
FIG. 3 is a high-level block diagram illustrating the functional modules within the antivirus client module 116 according to one embodiment of the present invention.

FIG. 3 is a high-level block diagram illustrating the functional modules within the antivirus client module 116 according to one embodiment of the present invention. In addition, FIG. 3 also illustrates the storage device 208 and the files 310 within it. The antivirus client module 116 is shown as being separate from the storage device 208 to illustrate a logical distinction between the two entities, even though in one embodiment the antivirus client module 116 is actually formed of files stored on the storage device.

As mentioned above, the storage device 208 holds files (of which the file labeled "310" is representative) that can be utilized by the workstation 114. The storage device 208 can be local or remote, and there can be multiple storage devices associated with one workstation 114. In one embodiment, the storage device 208 uses a file system to organize the files 310. Possible file systems include the File Allocation Table (FAT) system, the New Technology File System (NTFS), and/or the Windows File System (WinFS).

Broadly speaking, the files 310 are collections of executable code or data. Some files contain a mix of executable code and data, and in some instances the distinction between executable code and data is blurred. The contents of the files are organized into different formats. In many cases, the format of a file is identified by the file's extension. For example, a file containing executable code can have an extension such as .EXE, .COM, .SYS, .DLL, etc. Similarly, a file containing data can have an extension such as .DOC (usually indicating a MICROSOFT WORD data file), .MP3 (usually indicating file containing music), .JPG (usually indicating a file containing an image), and .TXT (usually indicating a file containing text). However, the file extension does not definitively describe the content of the file. For example, there are different types of .EXE files. Similarly, multiple applications might use the same file extensions for different types of data files.

For the most part, computer viruses are designed to infect particular types of files. For example, one type of virus might be designed to infect Windows 32-bit Portable Executable (PE) files, while another type of virus might be designed to infect MICROSOFT WORD .DOC files. As a result, some file types are more susceptible to viruses while other types (e.g., text files) are less susceptible to viruses.

Some viruses are designed to infect aspects of the workstation 114 other than files. For example, certain viruses will infect parts of the file system that are technically not within files. For purposes of convenience and clarity, this description uses the term "file" to encompass any portion of a workstation 114 that can be infected by a virus, regardless of whether that portion is technically a "file" within the standard definition.

The antivirus client module 116 includes a virus definitions module 312, a filtering module 314, and a file scanning module 316. The virus definition module 312 holds virus definitions describing characteristics of files that can potentially be infected by viruses on the workstation 114. The characteristics include information describing the types of files infected by a given virus. For example, the characteristics can specify that a virus infects .DOC files, Win32 PE files, and/or .JPG files. The virus definitions also include information enabling a determination of whether a file is actually infected by a given virus. For example, the information can specify a sequence of opcodes that indicates the presence of a virus.

The filtering module 314 filters the files on the storage device 208 using specified criteria to produce a filtered list of files. In one embodiment, the filtering module 314 analyzes the files on the storage device 208 to discern the characteristics of the files. The filtering module 314 uses the information describing the types of files infected by a given virus in the virus definitions module 312 to identify a set of the files 310 on the storage device 208 that are susceptible to the virus.

The file scanning module 316 receives a list of one or more files 310 from the filtering module 314 and determines whether the files are infected by a virus. In one embodiment, the file scanning module 316 uses the information within the virus definitions module 312 to analyze each file 310 and determine whether it is infected with a virus. For example, the file scanning module 316 can use string scanning and/or emulation-based techniques to detect the presence of a virus in the file 310.

Figure 4:
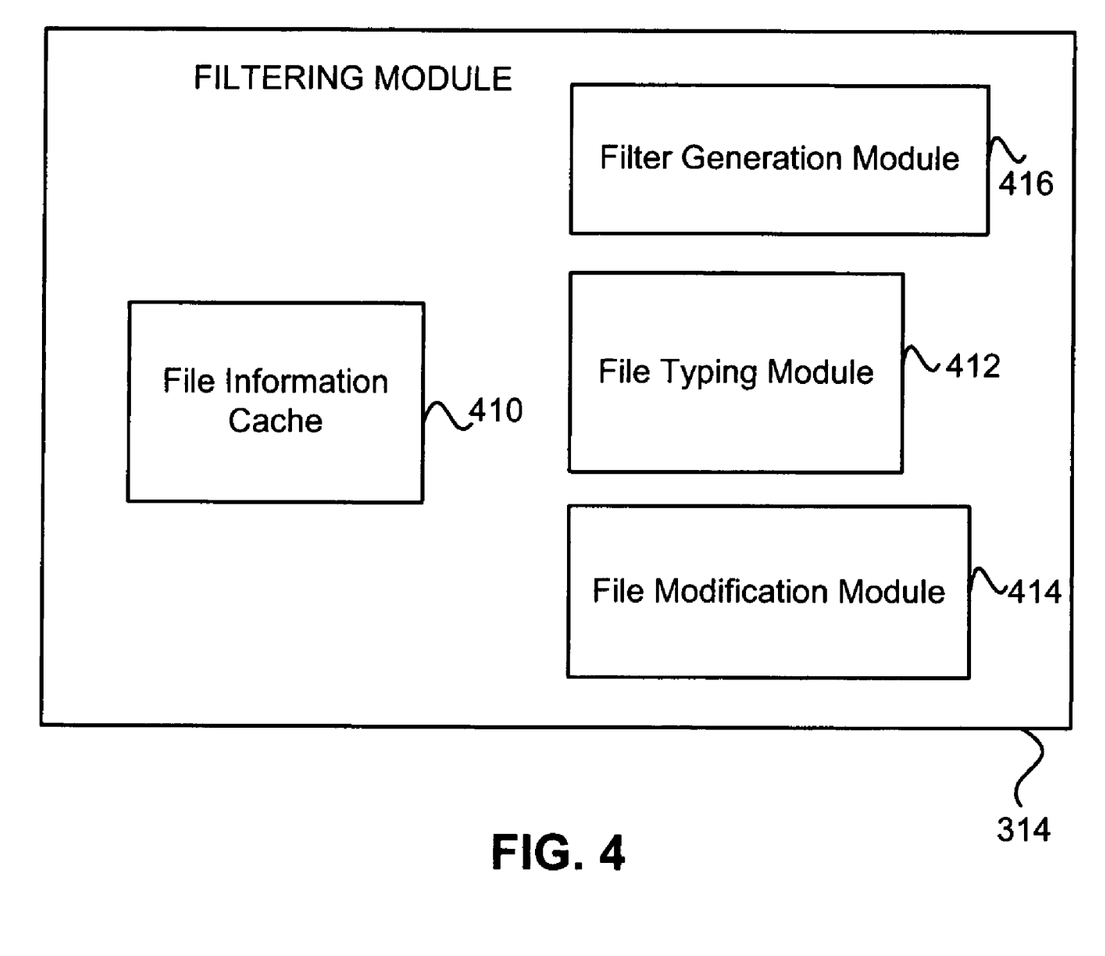
FIG. 4 is a high-levels block diagram illustrating modules within the filtering module 314 according to one embodiment of the present invention.

FIG. 4 is a high-level block diagram illustrating modules within the filtering module 314 according to one embodiment of the present invention. In this embodiment, the filtering module 314 includes a file information cache module 410 (referred to as the "file information cache"), a file typing module 412, a file modification module 414, and a filter generation module 416.

The file information cache 410 stores information identifying the files 310 on the storage device 208, and information specifying characteristics of the files that relate to the files' susceptibility to virus infection. In one embodiment, the information in the file information cache 410 is stored in a centralized location on the storage device 208. In another embodiment, some or all of the information is distributed to multiple locations on the storage device 208. For example, in one embodiment the information is stored as file attributes associated with each file on the storage device 208.

In one embodiment, the file information cache 410 stores information for only a subset of the files 310 on the storage device 208. For example, the file information cache 410 can store information for only files that are designated as "infectable" (and/or "non-infectable") by the file typing module 412 as described below. In another example, the file information cache 410 stores information for only certain types of files, such as .EXE files and/or .DOC files.

The file typing module 412 analyzes files 310 on the storage device 208, generates a unique identifier for each file being tracked, generates the information specifying the characteristics of the file relating to virus susceptibility, and inserts the identifier and information in the file information cache 410. In one embodiment, the file typing module 412 is data-driven and uses instructions downloaded from the antivirus server 110 or another entity to analyze the files 310 and/or generate the information.

The unique identifier for a file generated by the file typing module 412 unambiguously identifies the file 310. In one embodiment, the unique identifier includes the path and name of the file 310. In another embodiment, the unique identifier includes the starting cluster number (if the file is stored using the FAT file system) and/or the master file table (MFT) record number (if the file is stored using the NTFS).

The information specifying the characteristics related to a file's virus-infection susceptibility can have different levels of granularity. In one embodiment, the file typing module 412 sets an "infectable" flag in the file information cache 410 that indicates whether the file 310 is susceptible to a virus. There are certain types of files, such as plain text files and other types of data files, that are never or very rarely infected by viruses. For these types of files, the file typing module 412 sets the "infectable" flag to indicate that the file 310 is not injectable. For types of files that are more frequently infected by viruses, the file typing module sets the flag to indicate that the file is "infectable." The logic utilized by the file typing module 412 to determine how to set the "infectable" flag can be dynamically adjusted in response to instructions downloaded from the antivirus server 110. In one embodiments, there are multiple "infectable" flags, with each flag corresponding to a particular virus or group of viruses.

In one embodiment, the file typing module 412 also generates more granular information related to a file's virus-infection susceptibility. This more granular information is referred to as "advanced criteria" and allows the files on the storage device 208 to be filtered to the highest degree possible based on susceptibility to particular types of viruses. Therefore, the advanced criteria generated by the file typing module 412 depend upon the techniques utilized by viruses to infect files. For example, if a widely-disseminated virus infects a certain type of .EXE file, then the file typing module 412 will generate advanced criteria indicating whether an .EXE file is of that type. Having this granularity of information allows the filtering module 314 to identify the smallest set of files that are susceptible to a particular virus. Since in one embodiment the file typing module 412 is data-driven, the advanced criteria can change depending upon the types of viruses in the wild, the type of workstation 114, and/or other factors.

In one embodiment, the advanced criteria generated by the file typing module 412 include the type(s) of the file 310 (e.g., whether the file is a particular type of executable file, a MICROSOFT WORD document, a text file, etc.). The advanced criteria also include the header information records for file types that have such records. The header information records indicate, for example, whether a file is an .EXE or .DLL file, include a SizeOfCode field indicating the size of the file's code sections, and specify the location of the file's main entry point(s) and the number of sections in the file, etc. The advanced criteria also include the section information records for the file 310, the size of the file, and a hash of the file's entry point(s), etc. Likewise, the advanced criteria can include the number of macros within a .DOC file, etc. Embodiments of the file typing module 412 can generate other advanced criteria instead of, or in addition to, the criteria described herein.

The file modification module 414 detects when a file 310 tracked by the file information cache 410 is modified and/or when a new file is created. In one embodiment, the file modification module 414 monitors the operation of the workstation 114 and detects when a file 310 is opened for writing and then closed, and/or other operations that indicate that the contents of a file may have changed, a file has been created, and/or a file has been deleted. In response to the creation of a new file or modification of an existing file, the file modification module 414 calls the file typing module 412 to update file information cache 410 to account for the change. If a file is deleted, in one embodiment the file modification module 414 invalidates the file's entry in the file information cache 410.

The filter generation module 416 receives filtering criteria from the file scanning module 316 and/or another module in the antivirus client module 116. The filter generation module 416 analyzes the information in the file information cache 410 to identify the set of files that satisfy the criteria and outputs a list of the files in the set to the module that provided the filtering criteria. In one embodiment, the filtering criteria received by the filter generation module specify a set of logical conditions that are evaluated against the "infectable" flag and/or advanced criteria stored in the file information cache 410.

For example, the filtering criteria can state: "Identify files where (type=DOC) AND ((number of macros>0) AND (Size of Macro>=3000 bytes))." In response to this query, the filter generation module 416 uses the information in the file information cache 410 to identify the set of files that are .DOC files, contain more than zero macros, and where the size of a macro is larger than, or equal to, 3000 bytes. In another example, the filtering criteria can state: "Identify files where (Type=PE) AND ((FileSize>=100 KB) AND (HeaderType!=DLL) AND (MainEPChecksum=0xDEADBEEF))." In response to this query, the filter generation module 416 uses the information in the file information cache 410 to identify the set of files that are of type PE, are larger than or equal to 100 KB, are not DLL files, and have a main entry point checksum equal to "DEADBEEF."

Figure 5:
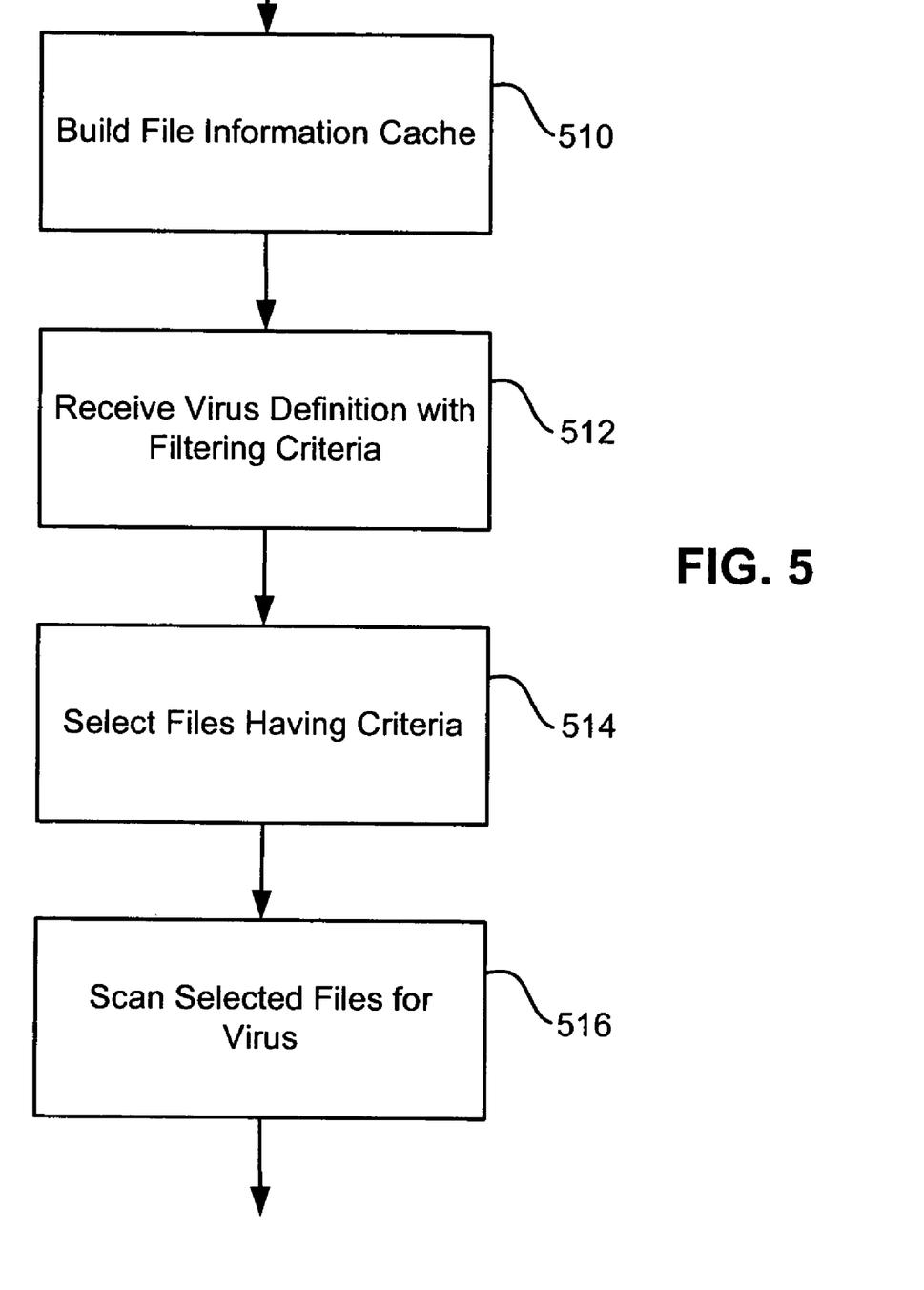
FIG. 5 is a flowchart illustrating steps performed to determine whether a virus has infected a workstation 114 according to one embodiment of the present invention.

FIG. 5 is a flowchart illustrating steps performed to determine whether a virus has infected a workstation 114 according to one embodiment of the present invention. Other embodiments can perform other steps in addition to, or instead of, the steps illustrated in FIG. 5. In addition, embodiments of the present invention can perform the steps in a different order.

The antivirus client module 116 builds 510 a file information cache 410 by analyzing the files on the workstation 114. This step can build the entire cache 410 at once, and/or it can incrementally add and/or update entries in the cache. For example, in one embodiment, the antivirus client module 116 builds the file information cache 410 when the module is initially installed on the workstation 114. In another embodiment, the antivirus client module 116 re-builds the file information cache when an event occurs at the workstation 114 that invalidates a significant percentage of the cache entries (such as a hard drive defragment operation). In an example where the antivirus client module 116 incrementally builds the cache 410, the antivirus client module 116 updates a file's cache entry when the file is modified and/or when the file is scanned by the file scanning module 316.

The antivirus client module 116 receives 512 a virus definition from the antivirus server 110 or another entity. The virus definition identifies a virus, includes filtering criteria describing the files that are susceptible to the virus, and/or describes how to detect the virus within a file. The filtering criteria can be specified explicitly and/or implicitly. Explicit filtering criteria use logic statements (or equivalent computer-encoded representations) like those described above to identify the files that are susceptible to the virus. Implicit filtering criteria utilize default values and/or other techniques to specify the criteria. For example, in one embodiment the implicit filtering criteria-specify to rely on (or ignore) the "infectable" flag.

The antivirus client module 116 selects 514 the files satisfying the filtering criteria. In one embodiment, the antivirus client module 116 utilizes the filter generation module 416 to query the file information cache 410 and identify the set of files on the workstation 114 that satisfy the criteria. For example, the query might return all files that have the "infectable" flag set to "yes." The antivirus client module 116 uses the virus definition to scan 516 the files satisfying the filtering criteria in order to determine whether the files are infected with the virus. The process of selecting 514 files satisfying filtering criteria and scanning 516 files can be repeated for different virus definitions.

In sum, an embodiment of the present invention reduces the time required to scan the files of a workstation 114 for a virus. The number of files scanned for a particular virus during a full system scan can be limited to just those files that are susceptible to the virus. In the event of a virus outbreak, the antivirus server 110 can deliver a virus definition to the antivirus client module 116 that specifies the characteristics of the files susceptible to the outbreak. The antivirus client module 116 can then perform a scan of only the susceptible files.

The above description is included to illustrate the operation of the preferred embodiments and is not meant to limit the scope of the invention. Where the description refers to "one" embodiment and/or "another" embodiment, it will be understood that the description is not necessarily referring to different embodiments. The scope of the invention is to be limited only by the following claims. From the above discussion, many variations will be apparent to one skilled in the relevant art that would yet be encompassed by the spirit and scope of the invention.

We claim:

1. A computer program product comprising:
   a computer-readable storage medium having executable computer program logic embodied therein for detecting computer viruses in files of a computer system, the computer program logic comprising:
      a file typing module for
         analyzing files of the computer system,
         generating information describing
            virus infection susceptibility characteristics of the files, and
         storing the generated information in
            a file information cache;
      a file modification module for
         detecting changes to the files and
         updating the stored information for
            changed files;
      a virus definition module for
         receiving from a remote server
            a plurality of virus definitions and
         holding the received virus definitions,
            each virus definition
               identifying a virus,
               describing one or more characteristics of files that are susceptible to the virus and
               describing how to detect the virus within a file;
      a filter generation module for
         receiving the characteristics of files
            that are susceptible to a virus
               as described by a virus definition and querying the file information cache
using characteristics described by the virus definition to identify
a subset of files having the characteristics; and
a file scanning module for
receiving the description of how to
detect the virus within a file from
the virus definition and
examining the files within the subset
to determine whether a file
is infected by the virus.

2. The computer program product of claim 1, wherein a virus definition comprises:
filtering criteria specifying a set of logical conditions that are satisfied by files that are susceptible to the virus identified by the virus definition.

3. A method of detecting a computer virus in a computer system, comprising:
analyzing a set of files of the computer system and
generating information describing
virus infection susceptibility characteristics of the files;
storing the generated information in
a file information cache;
detecting changes to files in the set and
updating the stored information for
changed files;
receiving from a remote server a virus definition
identifying a virus and
including filtering criteria
describing characteristics of files
that are susceptible to infection by the virus;
querying the file information cache
using the filtering criteria to identify,
from the set of files of the computer system,
a subset of files that
satisfy the filtering criteria; and
examining the files within the subset
to determine whether a file
is infected with the virus.

4. The method of claim 3, wherein the identifying comprises:
applying the filtering criteria
to the information describing the virus infection susceptibility characteristics
of the files
to identify
the set of files.

5. The method of claim 3,
wherein the filtering criteria include
one or more logical conditions that are satisfied
by files that are susceptible to the virus, and
wherein the querying the file information cache comprises:
evaluating the logical conditions against
the files within the set of files
to identify any files
satisfying the logical conditions; and
adding to the subset
any files identified as
satisfying the logical conditions.

6. The method of claim 3, wherein the filtering criteria specify file types that are susceptible to infection by the virus.

7. The method of claim 3,
wherein the filtering criteria specify
techniques utilized by the virus
to infect files of the computer system.

8. The method of claim 3,
wherein generating information describing characteristics of the files comprise
setting flags for files
having characteristics satisfying the filtering criteria
in the virus definition
received from the remote server.

9. A system for detecting computer viruses in files of a computer system, comprising:
a computer-readable storage medium having executable computer program logic embodied therein, the computer program logic comprising:
a file typing module for
analyzing files of the computer system,
generating information describing
virus infection susceptibility characteristics of the files, and
storing the generated information in
a file information cache;
a file modification module for
detecting changes to the files and
updating the stored information for
changed files;
a virus definition module for
receiving from a remote server
a plurality of virus definitions and
holding the received virus definitions,
each virus definition
identifying a virus,
describing one or more characteristics of files
that are susceptible to the virus and
describing how to detect the virus
within a file;
a filter generation module for
receiving the characteristics of files
that are susceptible to a virus
as described by a virus definition and
querying the file information cache
using characteristics described by the virus definition to identify
a subset of files having the characteristics; and
a file scanning module for
receiving the description of how to
detect the virus within a file from
the virus definition and
examining the files within the subset
to determine whether a file
is infected by the virus.

10. The system of claim 9, wherein a virus definition comprises:
filtering criteria specifying a set of logical conditions that are satisfied by files that are susceptible to the virus identified by the virus definition.

* * * * *